United States Patent
Uechi

(10) Patent No.: US 8,054,031 B2
(45) Date of Patent: Nov. 8, 2011

(54) CONVERTER DEVICE, ROTATING ELECTRICAL MACHINE CONTROL DEVICE, AND DRIVE DEVICE

(75) Inventor: Tatsuyuki Uechi, Toyoake (JP)

(73) Assignee: Aisin A W Co., Ltd., Anjo (JP)

( * ) Notice: Subject to any disclaimer, the term of this patent is extended or adjusted under 35 U.S.C. 154(b) by 441 days.

(21) Appl. No.: 12/314,596

(22) Filed: Dec. 12, 2008

(65) Prior Publication Data

US 2009/0167234 A1  Jul. 2, 2009

(30) Foreign Application Priority Data

Dec. 27, 2007 (JP) ................................ 2007-336200

(51) Int. Cl.
*H02P 27/04* (2006.01)

(52) U.S. Cl. ....... 318/800; 318/139; 318/376; 180/65.1; 180/65.21; 363/74; 363/98; 363/101

(58) Field of Classification Search .................. 318/800, 318/139, 376; 180/65.1, 65.21; 363/74, 363/98, 101

See application file for complete search history.

(56) References Cited

U.S. PATENT DOCUMENTS

| 7,120,037 B2 * | 10/2006 | Komatsu et al. ................ 363/37 |
| 7,200,007 B2 * | 4/2007 | Yasui et al. .................... 361/716 |

FOREIGN PATENT DOCUMENTS

| JP | A-2003-324942 | 11/2003 |
| JP | A-2004-135465 | 4/2004 |
| JP | A-2004-201463 | 7/2004 |
| JP | A-2006-324942 | 11/2006 |
| JP | A-2007-126007 | 5/2007 |
| JP | A-2008-079447 | 4/2008 |

* cited by examiner

*Primary Examiner* — Walter Benson
*Assistant Examiner* — Erick Glass
(74) *Attorney, Agent, or Firm* — Oliff & Berridge, PLC

(57) ABSTRACT

A converter device includes a converter circuit that includes a reactor connected to a primary side power supply, and a step-up feeding device that has a step-up switching element connected to the reactor and that boosts electric power of the primary side power supply by on/off switching the step-up switching element and outputting a stepped-up electric power as a secondary voltage; a converter control device that PWM-controls on/off switching of the step-up switching element so that the secondary voltage becomes equal to a secondary target voltage; and a temperature detecting device that detects a temperature of the reactor, wherein the converter control device limits PWM-controlled on/off switching of the step-up switching element for step-up operation when the temperature of the reactor increases to a first predetermined value or higher.

13 Claims, 8 Drawing Sheets

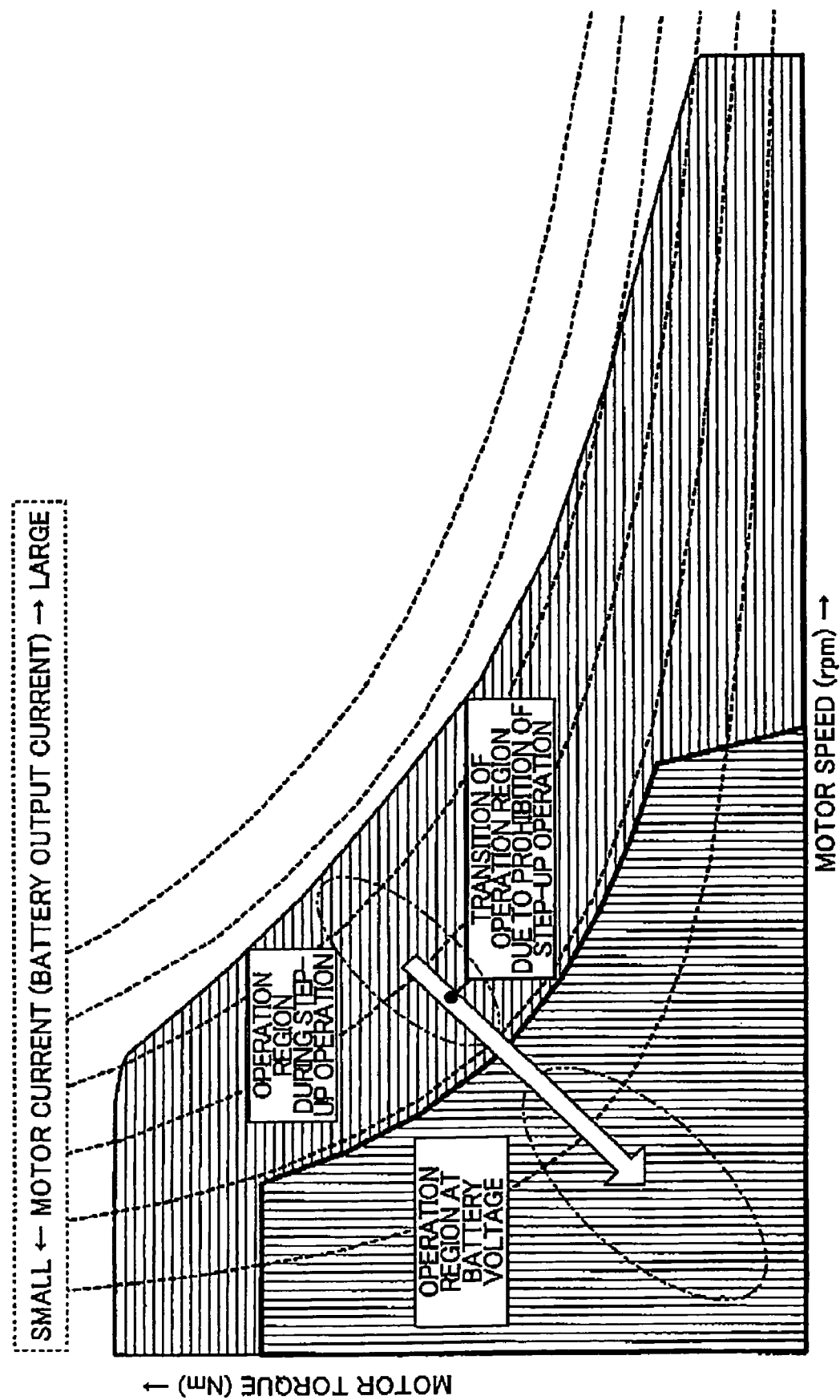

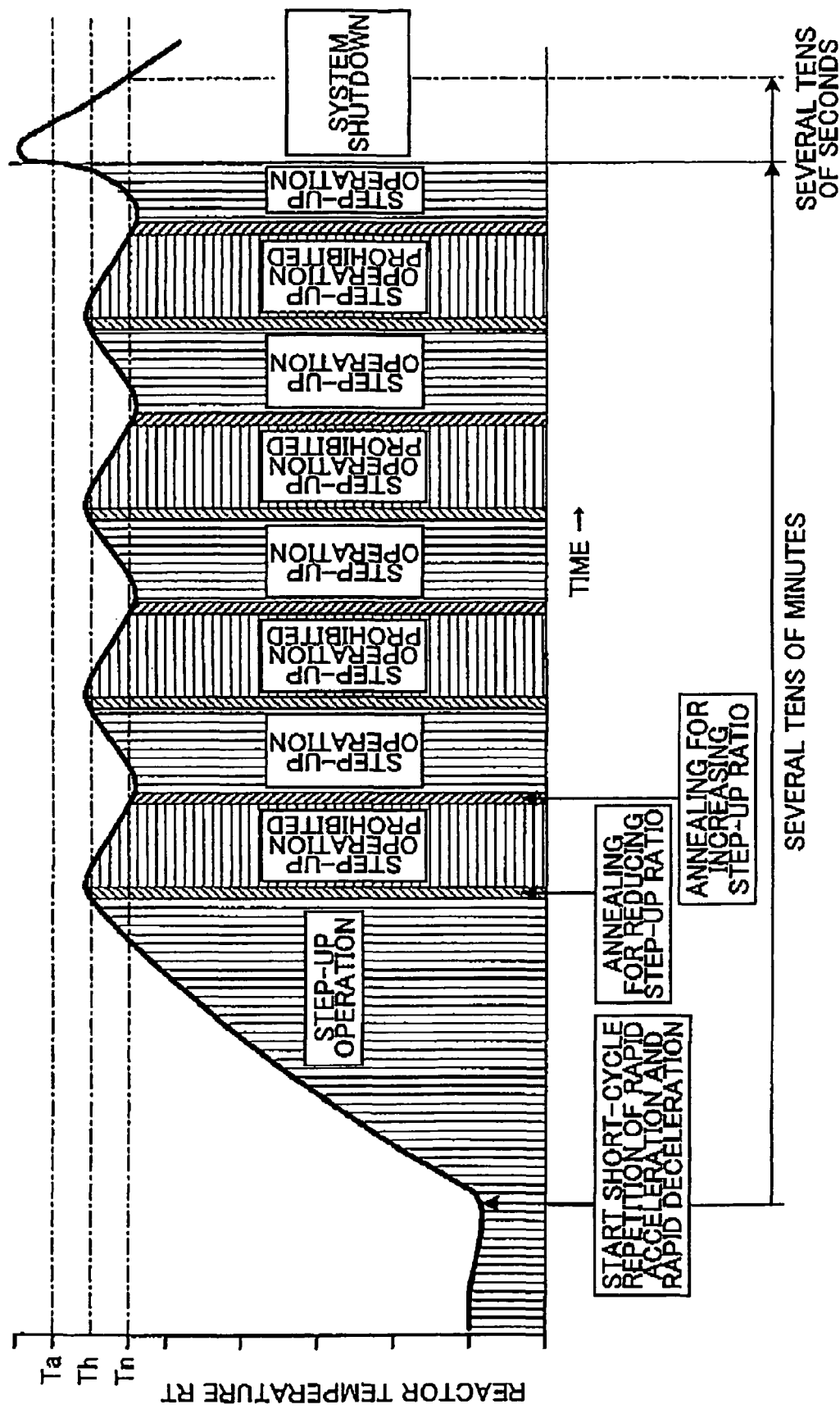

CONVERTER DEVICE, ROTATING ELECTRICAL MACHINE CONTROL DEVICE, AND DRIVE DEVICE

INCORPORATION BY REFERENCE

The disclosure of Japanese Patent Application No. 2007-336200 filed on Dec. 27, 2007 including the specification, drawings and abstract is incorporated herein by reference in its entirety.

BACKGROUND

The present invention relates to a converter device, a rotating electrical machine control device and a drive device.

Japanese Patent Application Publication No. JP-A-2003-324942 describes converter control for a bidirectional converter for performing a step-up operation for efficiently power-driving an electric motor and a step-down operation for charging a battery with regenerative electric power of the electric motor. In this converter control, the temperature of the bidirectional converter is detected, and a PWM controlled carrier frequency for switching on and off a step-up switching transistor is lowered in order to reduce heat generation and thus to prevent thermal destruction of the transistor. At this time, the carrier frequency is gradually lowered in order to prevent noise generated by a reactor in the converter from being suddenly changed in tone (noise, strange feeling, and abnormal noise) by the change in carrier frequency.

Japanese Patent Application Publication No. JP-A-2004-135465 also describes converter control for a bidirectional converter. In this converter control, the reactor temperature of the bidirectional converter is detected, and a carrier frequency that reduces noise corresponding to the temperature is extracted by map matching. The extracted carrier frequency is determined to be a PWM controlled carrier frequency for switching on and off a step-up switching transistor.

Japanese Patent Application Publication No. JP-A-2006-324942 describes torque control of an on-vehicle electric motor. In this torque control, the reactor temperature of a bidirectional converter and the coolant temperature are detected. When a difference between the detected temperatures is small (poor cooling capability), a torque command value (target torque) is limited to suppress a temperature increase. In order to suppress a sudden torque change (shock) caused by limiting the torque command value, an annealing process is performed to correct a step change of temperature detection data to a gently inclined change.

A wide rotation speed range and a wide torque range are required for a wheel driving motor. Therefore, in order to precisely control the output torque and the motor speed by PWM control, it is difficult to control the carrier frequency and the ON-duty width of PWM pulses in the whole operation range if a power supply voltage is constant. Moreover, the amount of harmonic components in an applied voltage of the motor increases as the ON-duty width is reduced. As a result, a motor loss (core loss) is increased, causing increase in power loss. In order to solve this problem, a motor control device for boosting a battery (primary side power supply) voltage using a boost converter to control the applied voltage of the motor to a wide range extending above from the battery voltage. Thus, the operation region of the wheel driving motor can be extended, for example, from the "operation region at battery voltage" to the "operation region during step-up operation". During braking operation of a vehicle, the wheel driving motor is controlled to a regeneration mode, and a bidirectional converter additionally having a step-up function to step down regenerative electric power of the motor to charge a battery is used, whereby vehicle driving is economically improved. Each of Japanese Patent Application Publications JP-A-2003-324942, JP-A-2004-135465, and JP-A-2006-324942 discloses a vehicle drive device using a bidirectional converter.

In both of a boost converter and a bidirectional converter, the conditions that are thermally the harshest for a reactor are during step-up operation and when a motor output is high. Factors that cause heat generation in the reactor under these conditions are a ripple current that flows through the reactor in response to turning on and off a step-up switching element and a direct current that is output from a battery through the reactor to a motor via the step-up switching element or a diode. In order to prevent heating of the reactor, a device that limits a target torque of the motor or limits the direct current has been used in related art. A target torque is limited in Japanese Patent Application Publication No. JP-A-2006-324942.

SUMMARY

In the case where the target torque is limited or the direct current is limited in a high torque output, high-speed rotating state in which the reactor temperature rises quickly, the operation region of the motor becomes a high speed, low torque region. In this case, the direct current of the battery is limited. However, since the motor operates in the high-speed region, a stepped-up voltage is not limited, and a ripple current that is generated by step-up operation is not limited. Accordingly, the effects of suppressing overheat by reducing power consumption by limiting the target torque or the direct current is not sufficiently obtained. In other words, it is difficult to sufficiently suppress overheat of the reactor in a short time. Moreover, since temperature increase of the reactor has a time lag, limiting of the target torque or limiting of the direct current for preventing overheat of the reactor is started at a protection start temperature that is much lower than a heat-resistance limit temperature, allowing for overshoot. Since the protection start temperature is low, the operation range of the motor is narrowed and the range in which the reactor can be used for step-up operation is narrowed. In the case where the direct current is directly limited by a primary side power supply (battery side), output current control of the battery is required, making fail-safe (protection from abnormal conditions) control of an electric motor control system complicated.

It is an object of the present invention to prevent overheat of a reactor. It is another object of the present invention to increase a temperature range in which the reactor can be used for a step-up operation. It yet another object of the present invention to prevent abrupt change in motor output, that is, shock, caused by a protection operation of a converter for preventing overheat of the reactor. The present invention can also achieve various other advantages.

In order to achieve the above objects, in the present invention, a reactor temperature is detected, and PWM-controlled on/off switching of a step-up switching element for step-up operation is limited while the detected reactor temperature is equal to or higher than a predetermined value.

A converter device according to an exemplary aspect of the invention includes a converter device that includes a converter circuit that includes a reactor connected to a primary side power supply, and a step-up feeding device that has a step-up switching element connected to the reactor and that boosts electric power of the primary side power supply by on/off switching the step-up switching element and outputting a stepped-up electric power as a secondary voltage; a converter control device that PWM-controls on/off switching of the step-up switching element so that the secondary voltage becomes equal to a secondary target voltage; and a temperature detecting device that detects a temperature of the reactor, wherein the converter control device limits PWM-controlled on/off switching of the step-up switching element for step-up operation when the temperature of the reactor increases to a first predetermined value or higher.

A drive device according to an exemplary aspect of the invention includes a first rotating electrical machine; a second rotating electrical machine; a first inverter that transmits and receives electric power to and from the first rotating electrical machine; a second inverter that transmits and receives electric power to and from the second rotating electrical machine; a converter circuit that includes a reactor having one end connected to a positive electrode of a primary side power supply, a step-up switching element for switching on and off between an other end of the reactor and a negative electrode of the primary side power supply, a step-down switching element for switching on and off between the first inverter and the second inverter and the other end, and diodes respectively connected in parallel with the switching elements, the converter circuit applying a secondary voltage generated by on/off switching of each switching element to the first inverter and the second inverter; a first secondary target voltage determining device that derives a first secondary target voltage corresponding to a target torque and a rotation speed of the first rotating electrical machine; a second secondary target voltage determining device that derives a second secondary target voltage corresponding to a target torque and a rotation speed of the second rotating electrical machine; a converter control device that sets a higher one of the first secondary target voltage and the second secondary target voltage as a secondary target voltage of the converter circuit, and PWM-controls on/off switching of the step-up switching element and the step-down switching element so that the secondary voltage becomes equal to the secondary target voltage; a first motor control device that controls the first inverter based on the target torque and the rotation speed of the first rotating electrical machine and the secondary voltage so that an output torque of the first rotating electrical machine is controlled to the target torque; a second motor control device that controls the second inverter based on the target torque and the rotation speed of the second rotating electrical machine and the secondary voltage so that an output torque of the second rotating electrical machine is controlled to the target torque; a temperature detecting device that detects a temperature of the reactor; and a converter control limiting device that limits the PWM-controlled on/off switching of the step-up switching element when the temperature of the reactor increases to a first predetermined value or higher.

BRIEF DESCRIPTION OF THE DRAWINGS

Various exemplary aspects of the invention will be described with reference to the drawings, wherein:

FIG. 6 is a graph showing an operation region of motors that is determined by converter control by the converter control device and motor drive control by motor control devices;

FIG. 7 is a graph showing an example of temperature change in a reactor shown in FIG. 1;

DETAILED DESCRIPTION OF THE PREFERRED EMBODIMENTS

Other objects and features of the present invention will become apparent from the following description of embodiments with reference to the accompanying drawings.

First Embodiment

Figure 1:
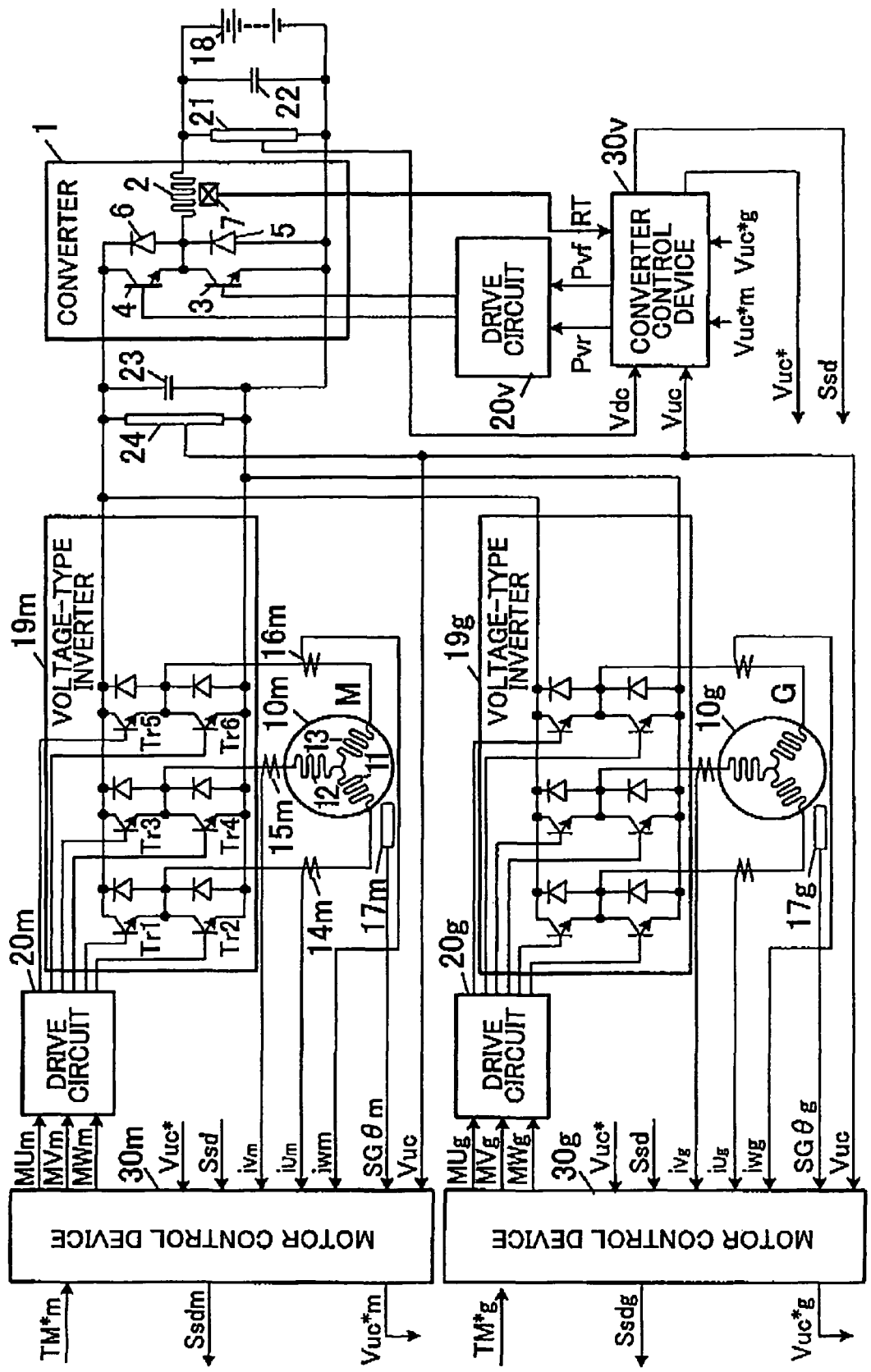
FIG. 1 is a block diagram schematically showing a structure of a first embodiment of the present invention.

FIG. 1 schematically shows a first embodiment of the present invention. In this embodiment, an electric motor 10m, which is a rotating electrical machine to be controlled, is a permanent magnet type synchronous electric motor that is mounted on a vehicle for rotating wheels. The electric motor 10m includes permanent magnets in a rotor and includes three-phase coils 11 to 13 i.e., U-phase, V-phase, and W-phase coils in a stator. A voltage type inverter 19m supplies electric power of an on-vehicle battery 18 to the electric motor 10m. A rotor of a resolver 17m for detecting a magnetic pole position of the rotor is connected to the rotor of the electric motor 10m. The resolver 17m generates an analog voltage (rotation angle signal) SG θm indicating a rotation angle of its rotor and applies the analog voltage SG θm to a motor control device 30m.

When the power of an electric equipment portion on the vehicle is ON, a primary side capacitor 22 is connected to the battery 18, which is an on-vehicle storage battery, and forms a primary side power supply together with the battery 18. A voltage sensor 21 applies a voltage detection signal Vdc indicating a voltage of the primary side capacitor 22 (a voltage of the on-vehicle battery 18) to a converter control device 30v. In this embodiment, a voltage-dividing resistor is used for the voltage sensor 21. One end of a reactor 2 of a bidirectional converter circuit 1 is connected to a positive electrode (+line) of the primary side power supply.

The converter circuit 1 further includes a step-up switching element 3 for switching on/off between the other end of the reactor 2 and a negative electrode (−line) of the primary side power supply, a step-down switching element 4 for switching on/off between a positive electrode of a secondary side capacitor 23 and the other end, and diodes 5, 6 respectively connected in parallel with the switching elements 3, 4. The diode 5 has its anode connected to the other end of the reactor 2 and its cathode connected to the negative electrode (−line) of the primary side power supply. The diode 6 has its anode connected to the positive electrode of the secondary side capacitor 23 and its cathode connected to the other end of the reactor 2. In this embodiment, an IGBT (Insulated Gate Bipolar Transistor) is used as the switching elements 3, 4.

When the step-up switching element 3 is turned on (conductive), a current flows from the primary side power supply (18, 22) to the step-up switching element 3 through the reactor 2, and the reactor 2 accumulates the electric power. When the step-up switching element 3 is turned off (non-conductive), the reactor 2 discharges a high voltage to the secondary side capacitor 23 through the diode 6. In other words, a voltage higher than the voltage of the primary side power supply is induced to charge the secondary side capacitor 23. High voltage charging of the secondary side capacitor 23 is continued by repeating the on/off operation of the step-up switching element 3. In other words, the secondary side capacitor 23 is charged at a high voltage. If the on/off operation is repeated in a fixed cycle, the electric power that is accumulated in the reactor 2 increases according to the length of the ON period. The power feeding rate from the primary side power supply 18, 22 to the secondary side capacitor 23 through the converter circuit 1 (the power feeding rate for power running) can therefore be adjusted by adjusting the ON time in the fixed cycle (ON-duty: the ratio of the ON time to the fixed cycle), that is, by PWM control.

When the step-down switching element 4 is turned on (conductive), the accumulated electric power in the secondary side capacitor 23 is applied to the primary side power supply 18, 22 through the step-down switching element 4 and the reactor 2 (reverse power feeding: regeneration). In this case as well, the reverse power feeding rate (the power feeding rate for regeneration) from the secondary side capacitor 23 to the primary side power supply 18, 22 through the converter circuit 1 can be adjusted by adjusting the ON time of the step-down switching element 4 in a fixed cycle, that is, by PWM control.

The voltage type inverter 19m includes six switching transistors Tr1 to Tr6. The transistors Tr1 to Tr6 are respectively turned on (conductive) by six series of drive signals generated concurrently by a drive circuit 20m, and the voltage type inverter 19m converts a direct voltage of the secondary side capacitor 23 (an output voltage of the converter circuit 1, that is, a secondary voltage) to three series of alternating-current (AC) voltages having a phase difference of $2\pi/3$, that is, three-phase AC voltages, and applies the three-phase AC voltages to the three-phase (U-phase, V-phase, and W-phase) stator coils 11 to 13 of the electric motor 10m, respectively. As a result, three-phase currents iUm, iVm, iWm flow through the stator coils 11 to 13 of the electric motor 10m, respectively, whereby the rotor of the electric motor 10m is rotated. Each of the six switching transistors Tr1 to Tr6 is an IGBT.

In order to increase the power supply ability to turning on/off (switching) of the transistors Tr1 to Tr6 by PWM pulses and to suppress a voltage surge, the large-capacity secondary side capacitor 23 is connected to a secondary side output line of the converter circuit 1, that is, an input line of the inverter 19m. The primary side capacitor 22 of the primary side power supply, on the other hand, is a small, low-cost, small-capacity capacitor, and the capacity of the primary side capacitor 22 is significantly smaller than that of the secondary side capacitor 23. A voltage sensor 24 detects a secondary voltage Vuc of the converter circuit 1 and applies the detected secondary voltage Vuc to the converter control device 30v. Current sensors 14m to 16m using a hall IC are respectively mounted to feeder lines connected to the stator coils 11 to 13 of the electric motor 10m. The current sensors 14m to 16m respectively detect the three-phase currents iUm, iVm, and iWm, generate a current detection signal (analog voltage), and apply the generated current detection signal to the motor control device 30m.

Figure 2:
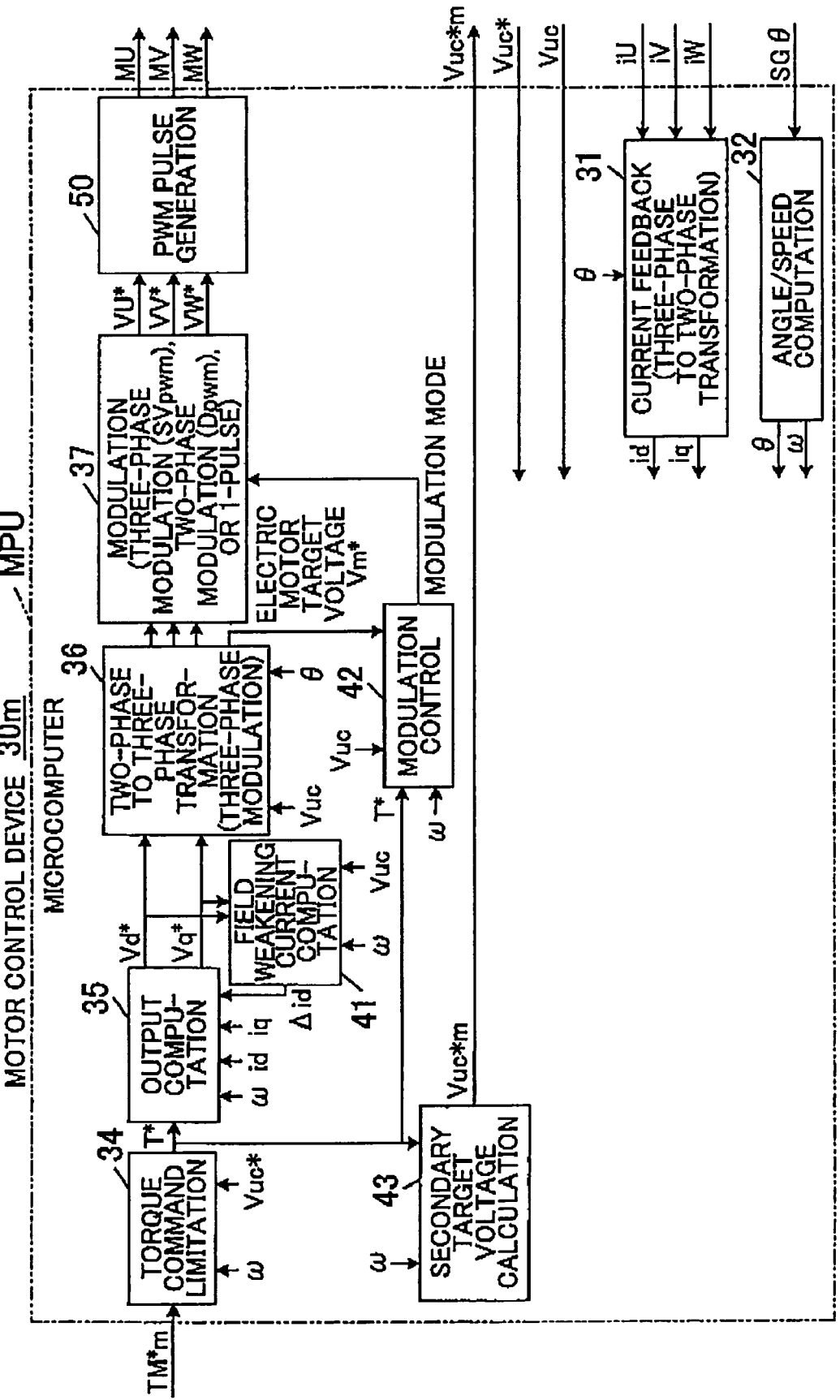
FIG. 2 is a block diagram schematically showing a functional structure of a motor control device shown in FIG. 1.

FIG. 2 shows a functional structure of the motor control device 30m. In this embodiment, the motor control device 30m is an electronic control device having a microcomputer MPU as a main body. The motor control device 30m includes a not-shown interface (signal processing circuit) between the microcomputer MPU and the drive circuit 20m, the current sensors 14m to 16m, the resolver 17m, the primary voltage sensor 21, and the secondary voltage sensor 24. The motor control device 30m further includes a not-shown interface (communication circuit) between the microcomputer MPU and a main controller of a not-shown vehicle running control system mounted on the vehicle.

Referring to FIG. 2, the microcomputer MPU of the motor control device 30m calculates the rotation angle (magnetic pole position) θ and the rotation speed (angular velocity) ω of the rotor of the electric motor 10m based on the rotation angle signal SG θ received from the resolver 17.

Note that, to be exact, the rotation angle and the magnetic pole position of the rotor of the electric motor 10m are not the same. However, the rotation angle and the magnetic pole position are in proportional relation to each other, and the number of magnetic poles p of the electric motor 10m determines a proportional coefficient. Similarly, the rotation speed and the angular velocity are not the same. However, the rotation speed and the angular velocity are also in proportional relation to each other, and the number of magnetic poles p of the electric motor 10m determines a proportional coefficient. In this specification, the rotation angle θ means the magnetic pole position. Although the rotation speed ω herein means the angular velocity, the rotation speed ω sometimes mean the rotation speed.

The main controller of the not-shown vehicle running control system applies a motor target torque TM* to the motor control device 30m, that is, the microcomputer MPU. Note that the main controller calculates a vehicle request torque TO* based on a vehicle speed and an accelerator opening degree of the vehicle, generates a motor target torque TM* corresponding to the vehicle request torque TO*, and applies the generated motor target torque TM* to the microcomputer MPU. The microcomputer MPU outputs the rotation speed ω rpm of the electric motor 10m to the main controller.

The microcomputer MPU reads a limit torque TM*max corresponding to a secondary target voltage Vuc* and the rotation speed ω from a limit torque table (lookup table) by torque command limitation 34. If the target torque TM* exceeds TM*max, the microcomputer MPU sets TM*max as a target torque T*. If the target torque TM* is equal to or less than TM*max, the microcomputer MPU sets the motor target torque TM* as the target torque T*. The motor target torque T* thus produced according to the limitation is applied to secondary target voltage calculation 43 and output computation 35.

Note that the limit torque table is a memory region having each value of the secondary target voltage Vuc* and each voltage value within a rotation speed range as addresses and storing maximum torques that can be generated by the electric motor 10m at the respective voltage values. In this embodiment, the limit torque table means a single memory region of a not-shown RAM in the microcomputer MPU. The limit torque TM*max has a larger value as the secondary target voltage Vuc* becomes higher, and has a smaller value as the secondary target voltage Vuc* becomes lower. The limit torque TM*max has a larger value as the rotation speed ω becomes lower, and has a smaller value as the rotation speed ω becomes higher.

The microcomputer includes a nonvolatile memory storing the data TM*max of the limit torque table. While the microcomputer initializes itself and the motor drive system shown in FIG. 1 in response to an operating voltage applied to the microcomputer, the microcomputer reads the data TM*max from the nonvolatile memory and writes the data TM*max to the RAM. The microcomputer further has a plurality of similar lookup tables, which will be described later. Like the limit torque table, these lookup tables also mean memory regions on the RAM, which store reference data stored in the nonvolatile memory.

The motor control device 30m, that is, the microcomputer MPU, determines in the secondary target voltage calculation 43 whether the operation is "power running" or "regeneration" based on a target torque T* and a rotation speed ω. The microcomputer MPU then reads a secondary target voltage Vuc*m assigned to the rotation speed ω of the electric motor 10m from a secondary target voltage table assigned to the target torque T* in a "power running" group if the operation is "power running" and in a "regeneration" group if the operation is "regeneration."

Each secondary target voltage table in the "power running" group is a lookup table storing secondary target voltage values corresponding to the respective rotation speeds. Each secondary target voltage table in the "regeneration" group is also a lookup table storing second target voltage values corresponding to the respective rotation speeds.

In this embodiment, a d-axis current id* and a q-axis current iq* corresponding to a target torque on d-q coordinates are calculated based on a high torque curve. Voltage currents Vd*, Vq* on the respective axes are then calculated based on the d-axis current id* and the q-axis current iq* and converted to three-phase control voltages. A high toque curve for "power running" is asymmetric to that for "regeneration" (the values id* and iq* are different for target torques having the same absolute value). Therefore, if a secondary target voltage property for each target torque is shared by "power running" and "regeneration," the torque control accuracy is reduced. In this embodiment, therefore, there are two secondary target voltage properties, that is, secondary target voltage properties for "power running" and "regeneration," for target torques having the same absolute value.

In the "output computation" 35, the microcomputer MPU of the motor control device 30m performs feedback control by a vector control computation on a known d-q axis model that has as a d-axis a direction of a magnetic pole pair in the rotor of the electric motor 10 and has as a q-axis a direction perpendicular to the d-axis. The microcomputer converts current detection signals iU, iV, iW of the current sensors 14m to 16m to digital signals and reads the digital signals. In current feedback computation, the microcomputer converts the three-phase current values iU, iV, iW on fixed coordinates to two-phase current values id, iq on the d-axis and the q-axis on rotational coordinates by using three-phase to two-phase transformation which is known fixed-to-rotational coordinate transformation.

A first high efficiency torque curve table A, which is a lookup table, is present in the output computation 35. The first high efficiency torque curve table A stores d-axis current values id corresponding to each motor speed ω and each motor target torque T*, that is, d-axis current values for generating each target torque T* at each motor speed.

The output torque of the electric motor is determined corresponding to the respective values of the d-axis current id and the q-axis current iq. For a single rotation speed value, that is, for the same motor rotation speed, there are an unlimited number of combinations of id and iq for outputting the same torque and these combinations are on a constant torque curve. On the constant curve, there is a combination of id and iq having the highest electric-power usage efficiency (lowest power consumption), and this combination is a high efficiency torque point. A curve connecting high efficiency torque points on a plurality of torque curves is a high efficiency torque curve. The high efficiency torque curve is present for each rotation speed. When the electric motor 10m is biased by using the d-axis current id and the q-axis current iq at the position of a given motor target torque T* on the high efficiency torque curve corresponding to the motor rotation speed as target current values, the electric motor 10m outputs the target torque T* and the motor is biased at a high electric-power usage efficiency.

In this embodiment, the high efficiency torque curve is divided into two curves: a first high efficiency torque curve A indicating d-axis values; and a second high efficiency torque curve B indicating q-axis values. Moreover, the first high efficiency torque curve A is formed of a pair of first high efficiency torque curves for use in a power-running region and in a regeneration region, respectively. Each first high efficiency torque curve of the pair indicates a d-axis target current corresponding to the motor rotation speed and the target torque.

The first high efficiency toque curve table A is a memory region storing d-axis target currents corresponding to each target torque T* for generating the target torque with the lowest power consumption and is formed of a pair of a power-running table A1 for power-running operation and a regeneration table A2 for regeneration operation. Whether the power-running table or the regeneration table is used is determined according to the result of determining whether the operation is power-running or regeneration based on the rotation speed ω of the electric motor and the given target torque T*.

Note that with increase in the rotation speed ω of the electric motor 10m, a counter electromotive force generated in the stator coils 11 to 13 is increased and a terminal voltage of the coils 11 to 13 is increased. This makes it difficult to supply a target current from the inverter 19 to the coils 11 to 13, and a target torque output cannot be obtained. In this case, by reducing the d-axis current id and the q-axis current iq by Δid and Δiq on the constant torque curve of the given motor target torque T*, respectively, the target torque T* can be output while the electric-power usage efficiency is reduced. This is called field-weakening control. A d-axis field weakening current Δid is generated by performing computation of an allowance for magnetic field adjustment, whereby a d-axis current command is calculated, and a q-axis current command is calculated. A d-axis field weakening current Δid is calculated in field weakening current computation 41. The contents of the field weakening current computation 41 will be described later.

In the calculation of the d-axis current command in the "output computation" 35, the microcomputer MPU subtracts the d-axis field weakening current Δid from the d-axis current value id read from the first high efficiency torque curve table A corresponding to the target torque T* determined by the torque command limitation, and calculates a d-axis target current id* from id*=−id−Δid.

A second high efficiency torque curve table B in the output computation 35 is used in the calculation of the q-axis current command. The second high efficiency torque curve table B is a table storing data of a corrected second high efficiency torque curve B. The corrected second high efficiency torque curve B is produced by correcting the second high efficiency torque curve B of the high efficiency torque curve indicating the q-axis values to a curve indicating q-axis target currents by subtracting a q-axis field weakening current Δiq corresponding to the d-axis field weakening current Δid from the q-axis values. The second high efficiency torque curve table B is a memory region storing d-axis target currents corresponding to each target torque T* and the d-axis field weakening current Δid for generating the target torque with the lowest power consumption, that is, a memory region storing target current values of the corrected second high efficiency torque curve B. The second high efficiency torque curve table B is also formed of a pair of a power-running table B1 for power-running operation and a regeneration table B2 for regeneration operation. Whether the power-running table or the regeneration table is used is determined according to the result of determining whether the operation is power-running or regeneration based on the rotation speed ω of the electric motor and the target torque T*.

In calculation of the q-axis current command, a q-axis target current iq* corresponding to the target torque T* and the d-axis field weakening current Δid is read from the second high efficiency torque curve table B, and is used as a q-axis current command.

In the output computation 35, the microcomputer MPU of the motor control device 30m calculates a current deviation δid between the d-axis target current id* and the d-axis current id, and a current deviation δiq between the q-axis target current iq* and the q-axis current iq. The microcomputer MPU then performs proportional control and integral control (PI computation of feedback control) based on the current deviations δid, δiq, and calculates a d-axis voltage command value vd* and a q-axis voltage command value vq* as an output voltage.

In two-phase to three-phase transformation 36 as the rotational/fixed coordinate transformation, the microcomputer MPU converts target voltages vd* and vq* on the rotational coordinates to phase target voltages VU*, VV*, and VW* on the fixed coordinates according to two-phase to three-phase transformation. When the voltage control mode is two-phase modulation, the microcomputer MPU supplies the phase target voltages VU*, VV*, and VW* to PWM pulse generation 50 through modulation 37. When the voltage control mode is three-phase modulation, the microcomputer MPU converts the phase target voltages VU*, VV*, and VW* in the three-phase modulation mode to two-phase voltages by two-phase modulation of the modulation 37, and supplies the two-phase voltages to the PWM pulse generation 50. When the voltage mode is a 1-pulse mode in which a rectangular wave of each phase is applied, the microcomputer MPU converts each of the phase target voltages VU*, VV*, and VW* in the three-phase modulation mode to a phase target voltage for applying a rectangular wave of each phase by 1-pulse conversion of the modulation 37, and supplies the phase target voltage to the PWM pulse generation 50.

When the three-phase target voltages VU*, VV*, and VW* are supplied to the PWM pulse generation 50, the PWM pulse generation 50 converts the three-phase target voltages VU*, VV*, and VW* to PWM pulses MU, MW, and MW for outputting these target voltage values, and outputs the PWM pulses MU, MW, and MW to the drive circuit 20m shown in FIG. 1. The drive circuit 20m concurrently generates six series of drive signals based on the PWM pulses MU, MV, and MW, and the transistors Tr1 to Tr6 of the voltage type inverter 19 are turned on/off by the respective series of drive signals. VU*, VV*, and VW* are thus applied to the stator coils 11 to 13 of the electric motor 10m, whereby phase currents iU, iV and iW flow through the stator coils 11 to 13, respectively. When each phase target voltage in the two-phase modulation mode is supplied, the PWM pulse generator generates PWM pulses for two phases, and an ON or OFF (fixed voltage output) signal for the remaining one phase. When each phase target voltage in the 1-pulse modulation mode is supplied, the PWM pulse generator outputs a current application interval signal for applying a rectangular wave in each phase.

The field weakening current computation 41 calculates a voltage saturation index m as a parameter for the field weakening control. In other words, the field weakening current computation 41 calculates a voltage saturation calculation value ΔV as a value representing the degree of voltage saturation, based on the d-axis voltage command value vd* and the q-axis voltage command value vq*, and calculates an allowance for magnetic field adjustment.

In the calculation of the allowance for magnetic field adjustment, ΔV is integrated. When the integrated value ΣΔV is positive, a d-axis field weakening current Δid for performing field weakening control is calculated by multiplying the integrated value ΣΔV by a proportional constant, and is set to a positive value. When the voltage saturation calculation value ΔV or the integrated value ΣΔV is zero or less, the adjustment value Δid and the integrated value ΣΔV are set to zero. The adjustment value Δid is used in calculation of a d-axis current command and calculation of a q-axis current command.

The "two-phase to three-phase transformation" 36 calculates an electric motor target voltage Vm* in the process of the two-phase to three-phase transformation. Vm*=√(Vd*2+Vq*2). Modulation control 42 calculates a modulation ratio Mi=Vm*/Vuc* based on the electric motor target voltage Vm* and the voltage Vuc (the voltage detection value of the voltage sensor 24) of the secondary side capacitor 23. The modulation control 42 further determines a modulation mode based on the target torque T*, the rotation speed ω, and the modulation ratio Mi of the electric motor 10m. According to the determined modulation mode, the modulation control 42 commands the modulation 37 to output each phase target voltage in the modulation mode.

The microcomputer MPU shown in FIG. 2 includes a RAM, a ROM, and a flash memory for recording data and recording various programs, in addition to a CPU. The programs, reference data, and lookup tables stored in the ROM or the flash memory are written to the RAM, and the microcomputer MPU performs an input process, computation, and an output process surrounded by a block shown by two-dot chain line in FIG. 2 based on the programs.

Figure 3:
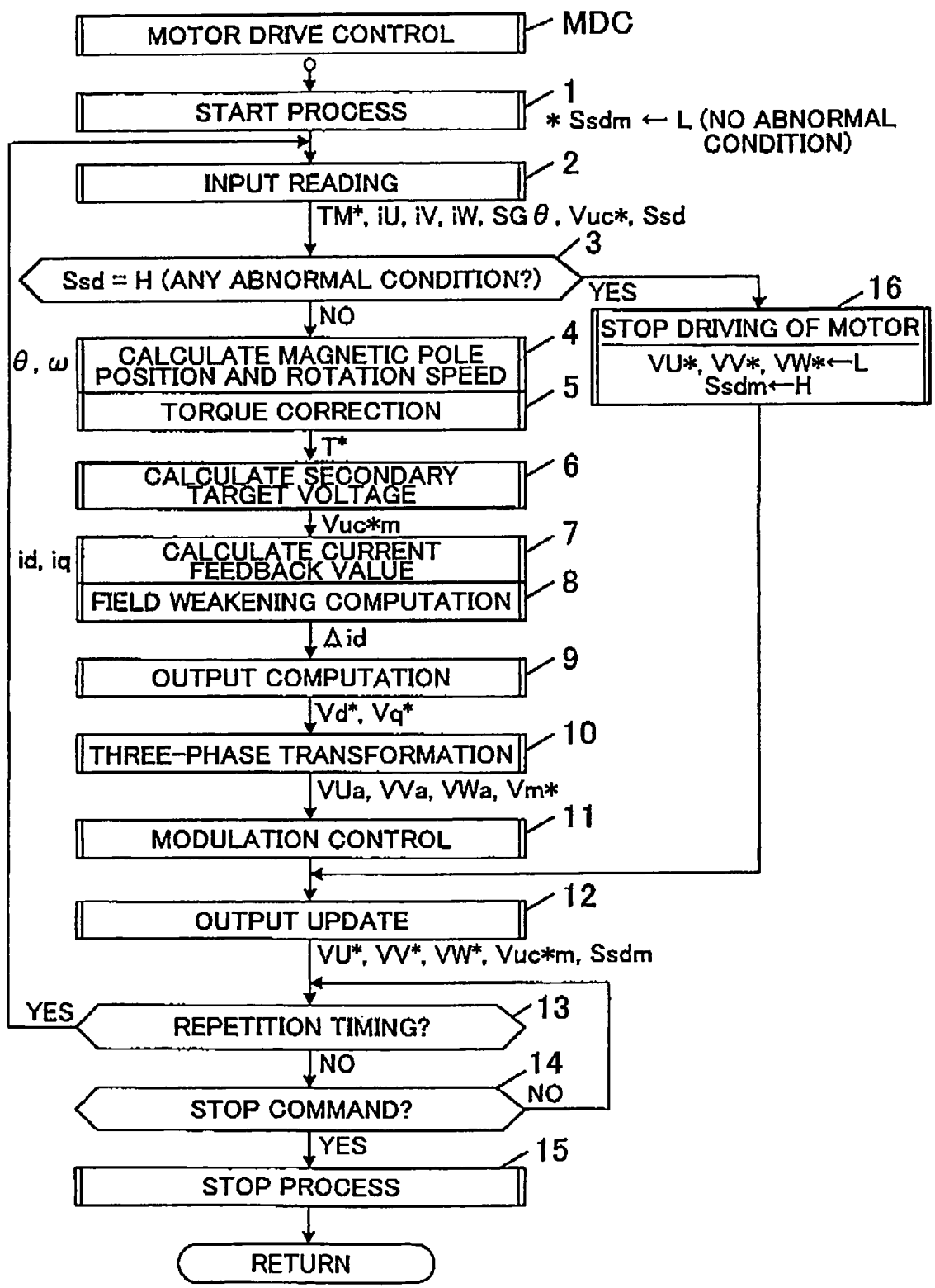
FIG. 3 is a flowchart schematically showing motor control of a microcomputer shown in FIG. 2.

FIG. 3 schematically shows motor drive control MDC that is executed by (the CPU of) the microcomputer MPU based on the programs. When an operating voltage is applied, the microcomputer MPU initializes the microcomputer MPU itself, the PWM pulse generation 50, and the drive circuit 20m, and sets the inverter 19m for driving the electric motor 10m to a stopped/stand-by state. The microcomputer MPU then waits for a motor driving start command from the main controller of the not-shown vehicle running control system. In response to the motor driving start command, the microcomputer MPU sets an initial value of the electric motor control to an internal register in "start process" (step 1) and reads an input signal or data in "input reading" (step 2). In other words, the microcomputer MPU receives from the main controller a first target torque TM*, each phase current value iU, iV, iW detected by the current sensors 14m to 16m, and a rotation angle signal SG θ of the resolver 17, and reads them by digital conversion. The microcomputer MPU also receives a secondary voltage target value Vuc* and a motor drive system shutdown request signal Ssd (high level H is significant) from the converter control device 30v that will be described later.

Note that, in the following description, the word "step" is omitted and only the step numbers are shown in the parentheses.

When the shutdown request signal Ssd is at a high level H which means that there is a shutdown request, the microcomputer MPU generates an output signal for stopping driving of the motor 10m, and an alarm signal Ssdm (high level H is significant) that informs the main controller of the not-shown vehicle running control system of the fact that overheat protection of the motor drive circuit has been cancelled (3, 16). The microcomputer MPU then outputs these signals to the inverter 19m and the main controller (12).

However, when the shutdown request signal Ssd is at a low level L that means that there is no request for shutdown, the microcomputer MPU calculates a rotation angle θ and a rotation speed ω (4), based on the rotation angle signal SG θ (rotation angle data SG θ) obtained in the "input reading" (2). This function is shown as angle/speed computation 32 in FIG. 2. The microcomputer MPU then reads from the limit torque table a read motor target torque TM*, a secondary voltage upper limit value Vuc*max and a limit torque TM*max corresponding to the calculated rotation speed ω. If the read motor target torque TM* exceeds TM*max, TM*max is set as a target torque T*. When the read motor target torque TM* is equal to or less than TM*max, the read motor target torque TM* is set as a target torque T* (5). This function is shown as the torque command limitation 34 in FIG. 2. The microcomputer MPU then determines in "secondary target voltage calculation" (6) whether the electric motor 10 is in a "power-running" mode or a "regeneration" mode. The microcomputer MPU selects a group corresponding to the determination result, and reads a secondary target voltage Vuc* assigned to the current rotation speed ω from a secondary target voltage table corresponding to the target torque T* in the selected group. The contents of the "secondary target voltage calculation" (6) are the same as those of the secondary target voltage calculation 43 shown in FIG. 2.

The microcomputer MPU then converts the read three-phase current detection signals iU, iV, iW to two-phase d-axis current value id and q-axis current value by three-phase to two-phase transformation (7). This function is shown as current feedback 31 in FIG. 2. The microcomputer MPU then calculates a d-axis field weakening current Δid for performing d-axis field weakening control (8). This function is shown as field weakening current calculation 41 in FIG. 2.

The contents of "output computation" (9) are the same as those of the output computation 35 in FIG. 2. The d-q axis voltage target values Vd* and Vq* calculated in the "output computation" (9) are converted to the phase target voltages VU*, VV*, and VW* in the three-phase modulation mode (10). An electric motor target voltage Vm* is also calculated at the same time. In the next "modulation control" (11), a modulation ratio Mi is calculated, and a modulation mode is determined based on the modulation ratio Mi, the target torque T* and the rotation speed ω.

The reference parameters for determining the modulation mode include the target torque T*, the rotation speed ω, and the modulation ratio Mi. The microcomputer MPU has modulation threshold tables (lookup tables) corresponding to the modulation modes (three-phase modulation, two-phase modulation, and 1-pulse) and the modulation ratios. Each modulation threshold table stores threshold values (a target torque value and a rotation speed value) of the modulation mode boundary. The microcomputer MPU selects a modulation threshold table corresponding to a current modulation mode (three-phase modulation, two-phase modulation, or 1-pulse) and a current modulation ratio, and then reads the threshold values, and compares the target torque T* and the rotation speed with the threshold values to determine the modulation mode to be used next.

In the next "output update" (12), the microcomputer MPU outputs each phase target voltage of the modulation mode determined in the modulation control (11) to the PWM pulse generation 50. The routine then returns to the "input reading" (2) after waiting for the next repetition process timing to come (13). The microcomputer MPU then executes the "input reading" (2) and the subsequent process described above. If the microcomputer MPU receives a stop command from the main controller of the not-shown vehicle running control system while waiting for the next repetition process timing to come, the microcomputer MPU stops outputting for biasing rotation of the motor (14, 15).

The control function of the motor control device 30m for controlling operation of the electric motor 10m for rotating the wheels has been described above.

Although an electric motor 10g that is rotatably driven by an on-vehicle engine is sometimes called an electric generator or a dynamotor, the electric motor 10g in the present embodiment functions as an electric motor (power running) for starting the engine when the engine is to be started, and functions as an electric generator (regeneration) that is rotatably driven by the engine after the engine is started and generates electric power. The function and operation of the motor control device 30g for controlling power running and regeneration of the electric motor 10g are the same as those of the motor control device 30m. The structure and operation of an inverter 19g for feeding electric power to the electric motor 10g are the same as those of the inverter 19m.

When the engine is started, the not-shown main controller applies a positive target torque TM*g to the motor control device 30g. The motor control device 30g then performs the same control operation as that of the motor control device 30m described above. After the engine is started and the engine output torque increases, the main controller switches the target torque TM*g to a negative value for electric power generation (regeneration). The motor control device 30g then controls the inverter 19g so that the output torque of the electric motor 10g becomes equal to the negative target torque (target load of the engine). The contents (output control computation) are the same as those of the output control computation of the motor control device 30m described above.

As described above, the secondary voltage Vuc (voltage of the secondary side capacitor 23), which is an output voltage of a converter 1, is used in the calculation 41 of the field weakening currents Δid, Δiq and the two-phase to three-phase transformation 36. Preferably, this secondary voltage Vuc is adjusted so as not to exceed a maximum secondary voltage value that can be achieved by the electric power capacity of the primary side power supply 18, 22, such that the secondary voltage Vuc is increased with increase in the target torque and with increase in the rotation speed, corresponding to the target torque TM*m, TM*g and the rotation speed. The converter control device 30v executes this adjustment of the secondary voltage Vuc.

In this embodiment, the converter control device 30v of FIG. 1 is also an electronic control device having a microcomputer as a main body. The converter control device 30v includes the microcomputer, a not-shown interface (signal processing circuit), and a PWM pulse generation. It further includes a not-shown interface (communication circuit) between the microcomputer and the motor control devices 30m, 30g. The converter control device 30v receives a secondary target voltage Vuc*m from the motor control device 30m and a secondary target voltage Vuc*g from the motor control device 30g, and selects a higher one of the secondary target voltages Vuc*m and Vuc*g as a secondary target voltage Vuc*. Based on the target voltage Vuc* and a current output voltage of the converter circuit 1, that is, a secondary voltage Vuc, the converter control device 30v generates a control output Pvc for controlling the secondary voltage Vuc to the target voltage Vuc* by feedback control computation. The converter control device 30v converts a control signal Pvc to a step-up PWM pulse Pvf for switching on and off the step-up switching element 3 of the converter circuit 1 and a step-down PWM pulse Pvr for switching on and off the step-down switching element 4 of the converter circuit 1, and outputs the PWM pulses Pvf, Pvr to the drive circuit 20v. The drive circuit 20v turns on and off the step-up switching element 3 and the step-down switching element 4 based on the PWM pulses Pvf, Pvr. Note that an OFF period (dead time) is set to each PWM pulse Pvf, PVr so that the step-down switching element 4 is OFF during an ON period of the step-up switching element 3 and the step-up switching element 3 is OFF during an ON period of the step-down switching element 4. By switching on and off the step-up switching element 3 and the step-down switching element 4 by the PWM pulses Pvf and Pvr, the secondary voltage Vuc that is output from the converter circuit 1 is controlled to the target voltage Vuc*.

Figure 4:
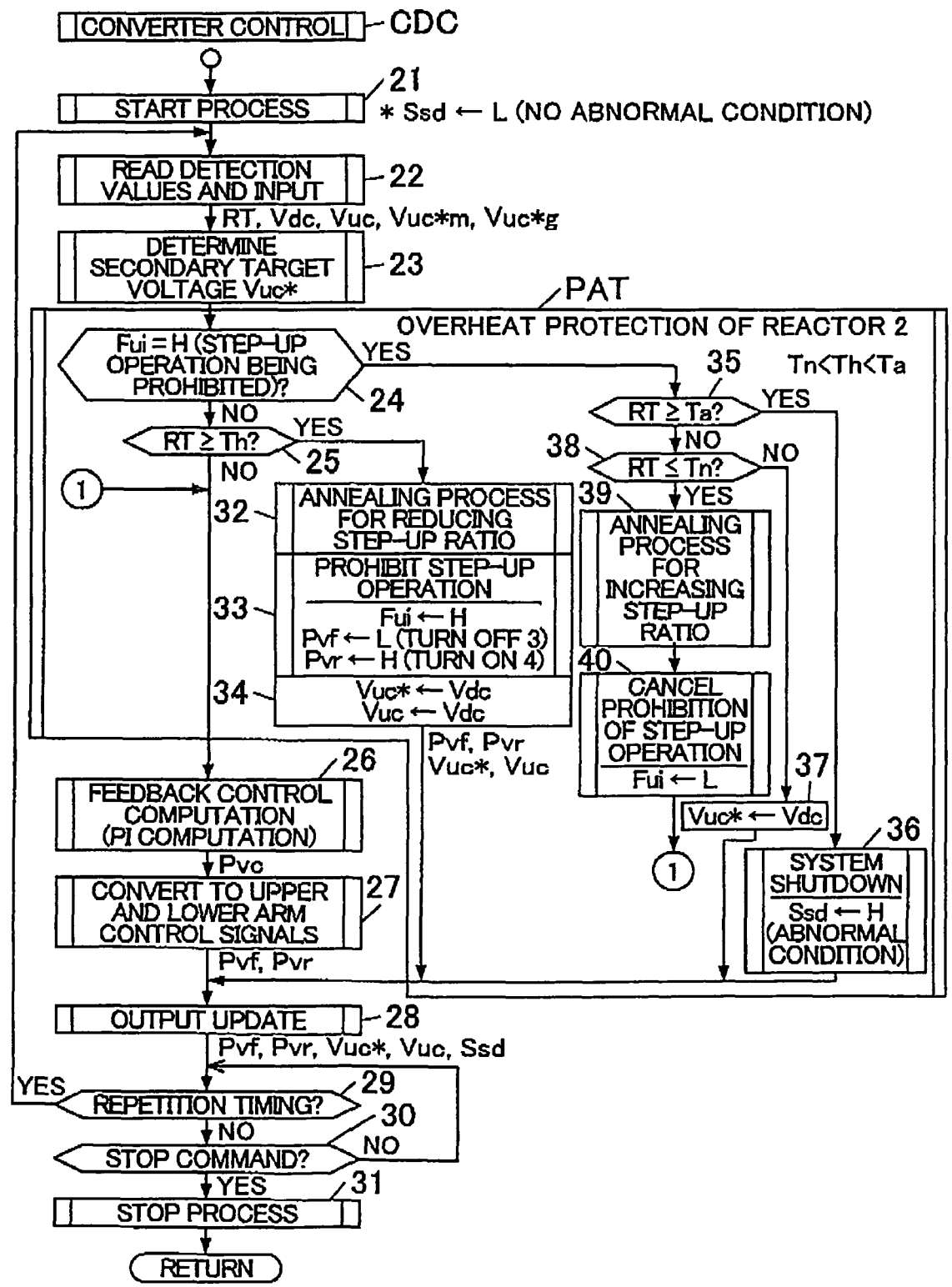
FIG. 4 is a flowchart schematically showing step-up control for a converter circuit by a microcomputer included in a converter control device shown in FIG. 1.

FIG. 4 schematically shows control of an output voltage of the converter circuit 1 by the converter control device 30v, that is, secondary voltage control. When an operating voltage is applied, a microcomputer of the converter control device 30v (hereinafter, simply referred to as the microcomputer) initializes the microcomputer itself, PWM pulse generation included in the microcomputer, and the drive circuit 20v to turn off both the step-up and step-down switching elements 3, 4 of the converter circuit 1. The microcomputer then waits for a motor drive start signal from the motor control device 30m or 30g. In response to the motor drive start signal, the microcomputer executes the "start process" (21) to set an initial value of the converter circuit control in an internal register. At this time, secondary target voltage data Vuc* to be output to the motor control devices 30m and 30g is set to an initial value 0, and a motor driving system shutdown request signal Ssd is rendered to low level L that indicates that there is no request for shutdown. Moreover, data of a flag register Fui to be referred to in "overheat protection of the reactor 2" PAT described below is initialized to L that indicates that step-up operation is allowed. Note that data H of Fui means that step-up operation is prohibited.

The microcomputer then reads detected values and data in "input reading" (22). In other words, the microcomputer A-to-D converts voltage detection signals Vdc, Vuc of the voltage sensors 21, 24 and a temperature detection signal RT of the temperature sensor 7 for detecting the temperature of the reactor 2, and reads the converted signals. The microcomputer also reads secondary target voltages Vuc*m and Vuc*g received from the motor control devices 30m and 30g, respectively. In the following "determination of the secondary target voltage Vuc*" (23), the microcomputer determines a higher one of the first and second secondary target voltages Vuc*m and Vuc*g received from the motor control devices 30m and 30g to be the secondary target voltage Vuc* of the converter circuit 1.

The routine then proceeds to the "overheat protection of the reactor 2" PAT, and the microcomputer refers to the data Fui of the flag register Fui and the reactor temperature RT (24, 25). If step-up operation is allowed (Fui: L) and the reactor temperature RT is less than a first predetermined value Th, the routine proceeds to "feedback control computation" (26) and the microcomputer generates a control output Pvc for controlling the secondary voltage Vuc to the secondary target voltage Vuc* by PI (proportional/integral) feedback control computation based on the secondary target voltage Vuc* determined in step 23 and the secondary voltage Vuc. In the following "conversion to upper and lower arm control signals" (27), the microcomputer converts the control signal Pvc to respective duties Pvf, Pvr of a step-up PWM pulse Pvf for turning on and off the step-up switching element 3 (lower arm) of the converter circuit 1 and a step-down PWM pulse Pvr for turning on and off the step-down switching element 4 (upper arm). The microcomputer thus generates PWM pulses Pvf, Pvr of the respective duties, and outputs the PWM pulses Pvf, Pvr to the drive circuit 20v (28). At this time, the microcomputer outputs the secondary target voltage Vuc* of the converter circuit 1 and the shutdown request signal Ssd (L: no request for shutdown) to the motor control devices 30m, 30g. The drive circuit 20v turns on/off the step-up switching element 3 and the step-down switching element 4 based on the PWM pulses Pvf, Pvr. As a result, the secondary voltage Vuc that is output from the converter circuit 1 is set to a secondary target voltage Vuc* or to a value approximately equal to the secondary target voltage Vuc*.

When an extremely harsh load is imposed such as long-time high-torque operation of the motor, and short-cycle, alternate repetition of rapid acceleration to a high speed value and rapid deceleration to a low speed value, the reactor 2 generates a large amount of heat and is subjected to rapid temperature increase. When the temperature RT of the reactor 2 reaches the first predetermined value Th or higher, the microcomputer executes "annealing process for reducing step-up ratio" (32). After sequentially reducing the secondary voltage Vuc to a battery voltage Vdc by this process, the microcomputer then switches the data Fui of the flag register Fui to H that indicates step-up operation is prohibited, and sets the PWM pulse signals Pvf and Pvr to L and H, respectively, so that the step-up switching element 3 (lower arm) is kept in an OFF state and the step-down switching element 4 (upper arm) is kept in an ON state (33). The microcomputer then changes the value of the secondary target voltage Vuc* to the battery voltage, that is, the primary side power supply voltage Vdc (34), and outputs the PWM pulse signals Pvf and Pvr to the drive circuit 20v. The microcomputer also outputs the secondary voltage Vuc, the secondary target voltage Vuc*, and the shutdown request signal (L: no request) to the motor control devices 30m, 30g (28). The converter circuit 1 thus stops step-up operation.

Figure 5A:
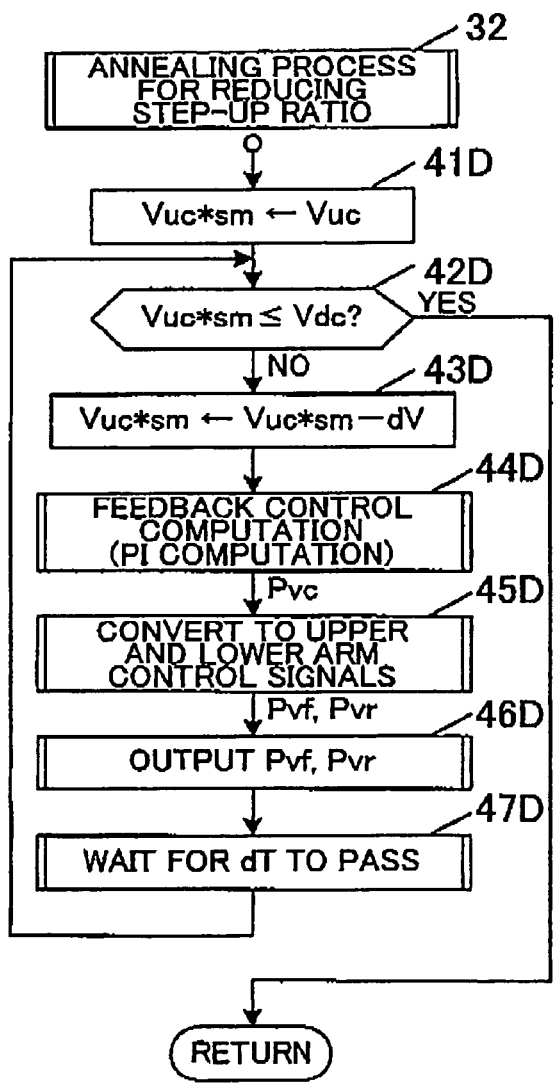
FIG. 5A is a flowchart showing contents of "annealing process for reducing a step-up ratio" shown in FIG. 4.

FIG. 5A shows the contents of the "annealing process for reducing step-down ratio" (32). In this process, the microcomputer sets the current secondary voltage Vuc as an initial value of an annealing target voltage Vuc*sm (41D). While sequentially reducing the annealing target voltage Vuc*sm by dV in a dT cycle (43D, 47D), the microcomputer generates a step-up PWM pulse Pvf and a step-down PWM pulse Pvr for outputting the annealing target voltage Vuc*sm as the secondary voltage, and updates the drive circuit 20v with the generated PWM pulses (44D to 46D). This process is continued until the annealing target voltage Vuc*sm reaches the battery voltage Vdc (the voltage of the primary side power supply). The "annealing process for reducing step-down ratio" is terminated when the annealing target voltage Vuc*sm becomes equal to or less than Vdc (from 42D to Return). In other words, the routine proceeds to step 33 in FIG. 4. By this annealing process, the PWM pulses Pvf, Pvr change gently and the step-up ratio, that is, the secondary voltage Vuc reduces gently, whereby the motor torque changes gently. As a result, torque shock (rapid decrease in motor output torque) does not occur.

By the above annealing process (32) and the prohibition of step-up operation (33), the output voltage of the converter circuit 1 is controlled to the battery voltage Vdc. Therefore, the operation region of the motors 10m, 10g by the inverter control of the motor control devices 30m, 30g changes from the "operation region during step-up operation" to the "operation region at battery voltage" shown in FIG. 6. Since a direct current (battery current) flowing through the reactor 2 is reduced in the operation region at the battery voltage, an electric power loss in the reactor 2 is reduced. Moreover, since on/off switching of the step-up and step-down switching elements 3, 4 is not performed, a ripple current flowing through the reactor 2 is substantially eliminated, and a harmonic current is substantially eliminated. As a result, a harmonic electric power loss in the reactor 2 is eliminated. This significantly reduces the heat generation amount of the reactor 2, whereby the temperature of the reactor 2 is reduced or the temperature increase in the reactor 2 is suppressed.

Referring back to FIG. 4, after executing the prohibition of step-up operation (33), the microcomputer refers to the reactor temperature RT every time the routine proceeds to the "overheat protection of the reactor 2" PAT (24, 35, 38). When the reactor temperature RT reaches at least a third predetermined value Ta that is higher than the predetermined value Th, the microcomputer keeps the L state of the step-up PWM pulse signal Pvf (a command to turn off the switching element 3) and the H state of the step-down PWM pulse signal Pvr (a command to turn on the switching element 4), and sets the shutdown request signal Ssd to H that indicates that there is a shutdown request (35, 36). The microcomputer then outputs the shutdown request signal Ssd (H: shutdown request) to the motor control devices 30m, 30g (28). In response to the shutdown request signal Ssd (H), the motor control devices 30m, 30g switch control of the inverters 19m, 19g to regenerative control. The motor control devices 30m, 30g then execute an annealing process for sequentially reducing a motor current (regeneration) flowing through the motors 10m, 10g and the inverters 19m, 19g and then cut off the motor current. In other words, the motor control devices 30m, 30g turn off all the switching elements of the inverters 19m, 19g. The motor control devices 30m, 30g then generate alarm signals Ssdm, Ssdg (High level H is significant) informing the main controller of the not-shown vehicle running control system of cancellation of overheat protection of the motor drive circuit (i.e., informing the main controller of the fact that overheat protection of the motor drive circuit has been cancelled). The motor control devices 30m, 30g output the generated warning signals Ssdm, Ssdg to the main controller.

While the reactor temperature RT does not reach the third predetermined value Ta and exceeds the second predetermined value Tn, the microcomputer continues the above prohibition of step-up operation, changes the value of the secondary target voltage Vuc* to the primary side power supply voltage Vdc (37), and outputs it to the motor control devices 30m, 30g (28).

If the reactor temperature RT reduces to the second predetermined value Tn or less while the prohibition of step-up operation is being continued (38), the microcomputer executes "annealing process for increasing step-up ratio" (39). After sequentially increasing the secondary voltage Vuc to the secondary target voltage Vuc* (a higher one of Vuc*m and Vuc*g), the microcomputer switches the data Fui of the flag register Fui to L indicating that the prohibition of step-up operation has been cancelled (40), and outputs the PWM pulse signals Pvf and Pvr to the drive circuit 20v (28) as the pulses of duties for outputting the secondary target voltage Vuc* (26, 27). As a result, the converter circuit 1 recovers the step-up operation and outputs the secondary target voltage Vuc* which is a higher one of Vuc*m and Vuc*g applied from the motor control devices 30m, 30g, or a voltage approximately equal to the secondary target voltage Vuc*, by step-up and step-down operation by the PWM pulse signals Pvf and Pvr.

Figure 5B:
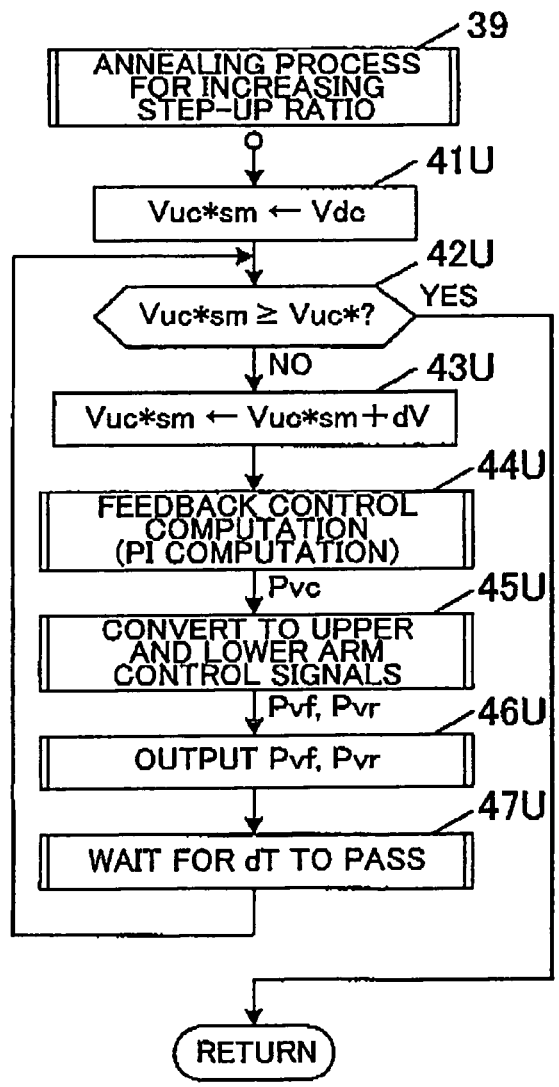
FIG. 5B is a flowchart showing contents of "annealing process for increasing a step-up ratio" shown in FIG. 4.

FIG. 5B shows the contents of the "annealing process for increasing step-up ratio" (39). In this process, the microcomputer sets the current secondary voltage Vuc (=Vdc) as an initial value (41U). While sequentially increasing the annealing target voltage Vuc*sm by dV in a dT cycle (43U, 47U), the microcomputer generates a step-up PWM pulse Pvf and a step-down PWM pulse Pvr for outputting the annealing target voltage Vuc*sm as the secondary voltage, and updates the drive circuit 20v with the generated PWM pulses (44U to 46U). This process is continued until the annealing target voltage Vuc*sm reaches the secondary target voltage Vuc*. The "annealing process for increasing step-up ratio" is terminated when the annealing target voltage Vuc*sm becomes equal to or higher than the secondary target voltage Vuc* (from 42U to Return). In other words, the routine proceeds to step 38 in FIG. 4. By this annealing process, the PWM pulses Pvf, Pvr change gently and the step-up ratio, that is, the secondary voltage Vuc increases gently, whereby the motor torque changes gently. As a result, torque shock (rapid increase in motor output torque) does not occur.

By the above annealing process (39) and the cancellation of the prohibition of step-up operation (40), the output voltage of the converter circuit 1 becomes substantially equal to the secondary target voltage Vuc* (a higher one of Vuc*m and Vuc*g). Therefore, the operation region of the motors 10m, 10g by the inverter control of the motor control devices 30m, 30g returns from the "operation region at battery voltage" to the "operation region during step-up operation" shown in FIG. 6. In this region, a sufficient motor current is supplied, whereby the motor torque restores to a desired value.

FIG. 7 shows a change in reactor temperature RT and a change in operation mode of the converter circuit 1 when rapid acceleration to a high speed value (high load power-running) and rapid deceleration to a low speed value (high load regeneration) are repeated in a short cycle. When the reactor temperature RT increases to Th or higher, prohibition of step-up operation is executed, whereby the reactor temperature RT reduces. The step-up operation is started when the reactor temperature RT reduces to Tn or less. By this process, the reactor temperature RT stayed at about Th or less until several tens of minutes from the start of the rapid acceleration/rapid deceleration. After the several tens of minutes, however, the reactor temperature RT increased rapidly, and system shutdown was executed for protection. The reactor temperature RT started reducing at a temperature lower than a thermal destruction temperature at which the system becomes no longer unusable. The reactor temperature RT reduced to a region where the step-up operation is allowed (Tn or less) after several tens of seconds from the shutdown. As shown in FIG. 7, Tn<Th<Ta.

According to this experiment, the above motor drive control MDC and converter control CDC are started if the main controller of the not-shown vehicle running control system issues a motor driving start command to the motor control devices 30m, 30g after several minutes from the system shutdown. Note that the respective periods of the "annealing for reducing step-up ratio" and the "annealing for increasing step-up ratio" are shown to be wide in FIG. 7. In this embodiment, however, each period is as short as several hundreds of milliseconds.

Second Embodiment

Hardware of the second embodiment is the same as that of the first embodiment described above, and the contents of motor drive control by motor control devices 30*m*, 30*g* are the same as those of the first embodiment. The contents of converter control CDC by a converter control device 30*v* of the second embodiment is generally the same as those of the first embodiment (FIG. 4). However, the contents of "annealing process for reducing step-up ratio" (32) and "annealing process for increasing step-up ratio" (39) in the converter control CDC of the second embodiment are different from those of the first embodiment.

Figure 8A:
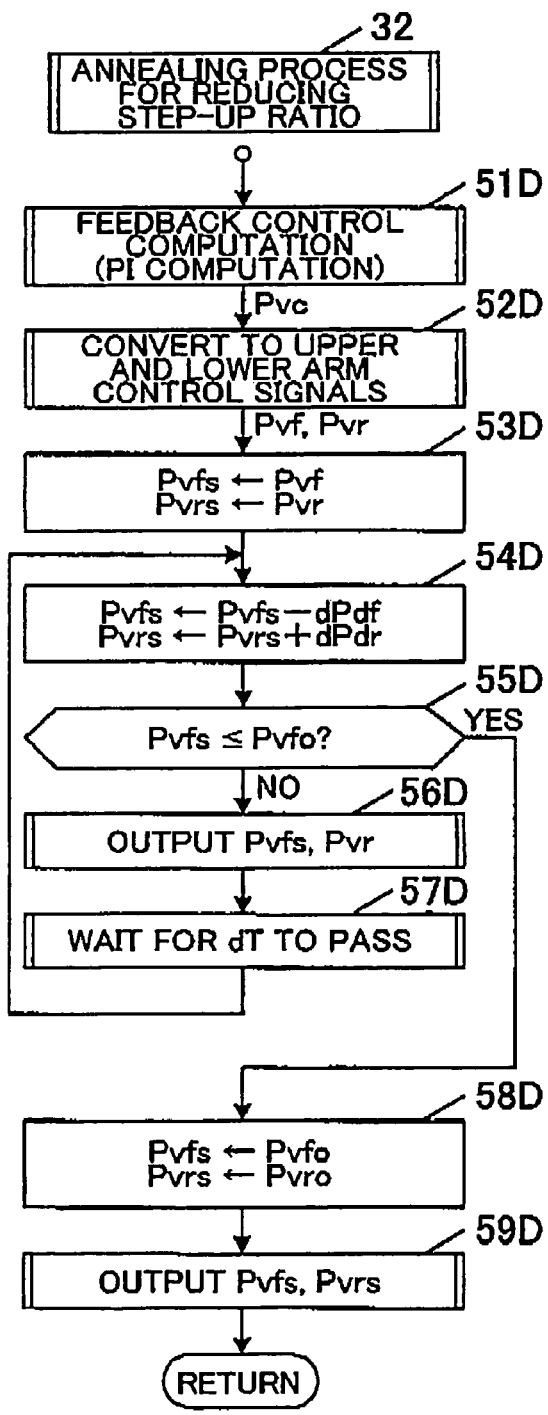
FIG. 8A is a flowchart showing contents of "annealing process for reducing a step-up ratio" in a second embodiment.
Figure 8B:
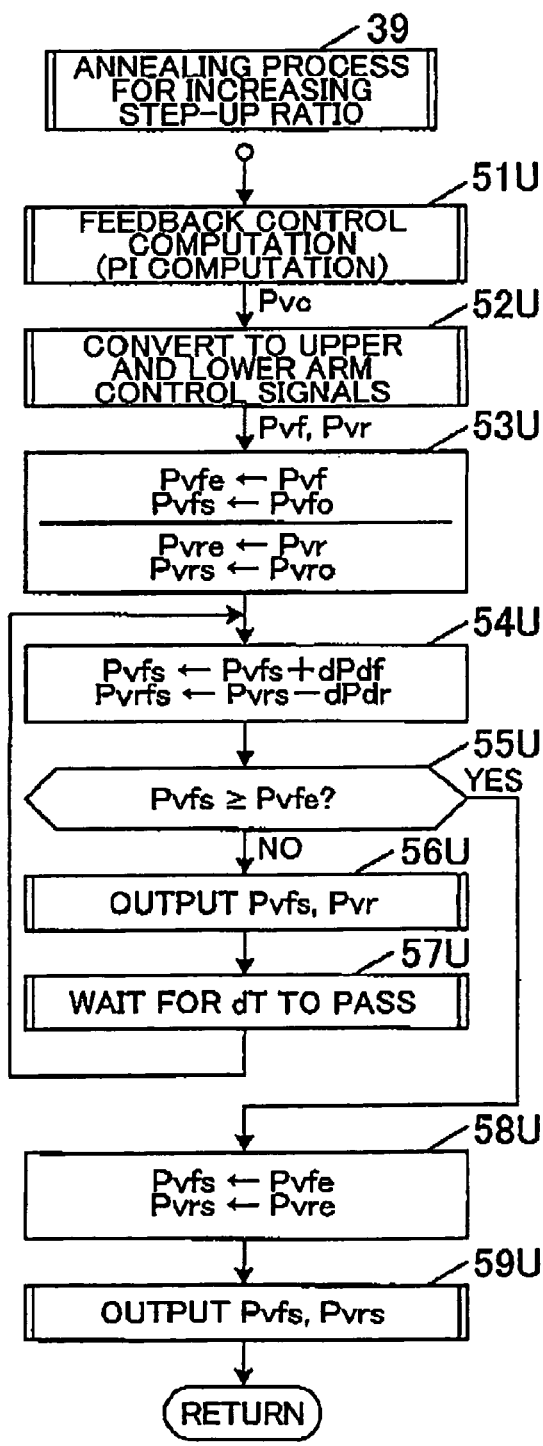
FIG. 8B is a flowchart showing contents of "annealing process for increasing a step-up ratio" in the second embodiment.

FIGS. 8A and 8B show the contents of the "annealing process for reducing step-up ratio" (32) and the "annealing process for increasing step-up ratio" (39) according to the second embodiment. In the "annealing process for reducing step-up ratio" (32) of the second embodiment shown in FIG. 8A, the microcomputer first calculates duties Pvf, Pvr of a step-up PWM pulse Pvf and a step-down PWM pulse Pvr for controlling a secondary voltage Vuc to a secondary target voltage Vuc*, based on a secondary voltage Vuc and a secondary target voltage Vuc* at the time when the annealing process is started (51D, 52D). The microcomputer sets the step-up duty Pvf of the step-up PWM pulse Pvf as an initial value of an annealing target duty Pvfs and sets the step-down PWM duty Pvr of the step-down PWM pulse Pvr as an initial value of an annealing target duty Pvfr (53D). While sequentially reducing the annealing target duty Pvfs by dPdf in a dT cycle and at the same time sequentially increasing the annealing target duty Pvfr by dPdr in a dT cycle (54D, 57D), the microcomputer generates a step-up PWM pulse Pvf of the annealing target duty Pvfs and a step-down PWM pulse Pvr of the annealing target duty Pvrs, and updates the drive circuit 20*v* with the generated PWM pulses (56D). This process is continued until the annealing target duty Pvfs becomes equal to a value Pvfo (Vuc=a value equal to the battery voltage Vdc) at which no step-up operation is performed. If the annealing target duty Pvfs becomes equal to or less than the value Pvfo at which no step-up operation is performed, the microcomputer sets the respective duties of the step-up PWM pulse Pvf and the step-down PWM pulse Pvr to values Pvfo, Pvro at which no step-up operation is performed (58D, 59D), and terminates the "annealing process for reducing step-up ratio" (from 59D to Return). In other words, the routine proceeds to step 33. By this annealing process, the PWM pulses Pvf, Pvr change gently and the step-up ratio, that is, the secondary voltage Vuc, reduces gently, whereby the motor torque changes gently. As a result, torque shock (rapid decrease in motor output torque) does not occur.

In the "annealing process for increasing step-up ratio" (39) of the second embodiment shown in FIG. 8B, the microcomputer first calculates duties Pvf, Pvr of a step-up PWM pulse Pvf and a step-down PWM pulse Pvr for controlling a secondary voltage Vuc to a secondary target voltage Vuc*, based on a secondary voltage Vuc and a secondary target voltage Vuc* at the time when the annealing process is started (51U, 52U). The microcomputer sets the calculated step-up duty Pvf and the calculated step-down duty as end target values Pvfe and Pvre, respectively. The microcomputer also sets duties Pvfo and Pvro at which no step-up operation is performed as initial values of annealing target duties Pvfs and Pvrs, respectively (53U). While sequentially increasing the annealing target duty Pvfs by dPdf in a dT cycle and at the same time sequentially reducing the annealing target duty Pvfr by dPdr in a dT cycle (54U, 57U), the microcomputer generates a step-up PWM pulse Pvf of the annealing target duty Pvfs and a step-down PWM pulse Pvr of the annealing target duty Pvrs, and updates the drive circuit 20*v* with the generated PWM pulses (56U). This process is continued until the annealing target duty Pvfs becomes equal to the end target value Pvfe (Vuc=a value equal to Vuc*). If the annealing target duty Pvfs becomes equal to or higher than the value Pvfe corresponding to the secondary target value Vuc*, the microcomputer sets the respective duties of the step-up PWM pulse Pvf and the step-down PWM pulse Pvr to the values Pvfe, Pvre corresponding to the secondary target voltage Vuc* (58U, 59U) and terminates the "annealing process for increasing step-up ratio" (from 59U to Return). In other words, the routine proceeds to step 40 in FIG. 4. By this annealing process, the PWM pulses Pvf, Pvr change gently and the step-up ratio, that is, the secondary voltage Vuc, increases gently, whereby the motor torque changes gently. As a result, torque shock (rapid increase in motor output torque) does not occur. The other functions and operations of the second embodiment are the same as those of the first embodiment.

According to an exemplary aspect of the invention, by limiting the PWM-controlled switching on/off of the step-up switching element for step-up operation, a "ripple" current, which is one of the factors that cause heat generation in the reactor, is reduced. Heat generation in the reactor is therefore reduced, and temperature increase in the reactor is suppressed accordingly, or the reactor temperature is reduced. While the switching on/off for step-up operation is being limited, an "operation region during step-up operation" (e.g., FIG. 6) of a rotating electrical machine that is fed with a secondary voltage is correspondingly narrowed to a direction to converge to an "operation region at battery voltage." This indirectly reduces the rotating electrical machine torque (applied current). As a result, fail-safe control of a rotating electrical machine control system can be prevented from being complicated. Moreover, since reduction in the "ripple" current reduces heat generation, the first predetermined value for starting the limiting of the switching on/off for step-up operation, that is, a protection start temperature is increased. As a result, the range in which the reactor can be used for step-up operation can be increased.

According to an exemplary aspect of the invention, by the "annealing process," the limiting of the PWM-controlled switching on/off for step-up operation gently and gradually becomes strict. Therefore, ON-duty of the PWM control changes gently, and abrupt change in rotating electrical machine torque, that is, shock, does not occur.

According to an exemplary aspect of the invention, cancellation of the limiting of the PWM-controlled switching on/off for step-up operation is started when the reactor temperature reduces to a second predetermined value lower than the first predetermined value. This prevents an unstable state from happening in which limitation and cancellation are switched in a short period. Moreover, due to the "annealing process" for sequentially increasing the secondary target voltage in the predetermined pattern, the limiting of the PWM-controlled switching on/off for step-up operation is gradually and gently cancelled. Therefore, ON-duty of the PWM control changes gently, and abrupt change in rotating electrical machine torque, that is, shock, does not occur.

According to an exemplary aspect of the invention, a rotating electrical machine can be power-driven in a step-up operation mode and regeneratively controlled in a step-down operation mode.

What is claimed is:
1. A converter device, comprising:
    a converter circuit that includes a reactor connected to a
        primary side power supply, and a step-up feeding device
        that has a step-up switching element connected to the
        reactor and that boosts electric power of the primary side power supply by on/off switching the step-up switching element and outputting a stepped-up electric power as a secondary voltage;

a converter control device that pulse width modulation (PWM)-controls on/off switching of the step-up switching element so that the secondary voltage becomes equal to a secondary target voltage; and a temperature detecting device that detects a temperature of the reactor, wherein the converter control device limits PWM-controlled on/off switching of the step-up switching element for step-up operation when the temperature of the reactor increases to a first predetermined value or higher, and wherein the converter control device starts an annealing process for sequentially reducing the secondary target voltage in a predetermined pattern when the temperature of the reactor increases to the first predetermined value or higher, and stops the on/off switching when the secondary target voltage reduces to a voltage of the primary side power supply or a voltage close to the voltage of the primary side power supply.

2. The converter device according to claim 1, wherein:

when the temperature of the reactor reduces to a value equal to or lower than a second predetermined value lower than the first predetermined value after the on/off switching is stopped, the converter control device starts an annealing process for sequentially increasing the secondary target voltage in a predetermined pattern by starting the on/off switching, in order to increase the secondary voltage to the secondary target voltage indicated by the converter control device or to a voltage close to the secondary target voltage.

3. The converter device according to claim 1, wherein:

the converter circuit includes the reactor having one end connected to a positive electrode of the primary side power supply, the step-up switching element for switching on and off between an other end of the reactor and a negative electrode of the primary side power supply, and a step-down switching element for switching on and off between the other end of the reactor and a positive electrode of a load, and diodes respectively connected in parallel with the switching elements; and the converter control device applies a voltage control signal including a step-up PWM pulse for on/off switching the step-up switching element and a step-down PWM pulse for on/off switching the step-down switching element to the converter circuit.

4. The converter device according to claim 3, wherein:

the converter control device limits the PWM-controlled on/off switching of the step-down switching element when the temperature of the reactor increases to the first predetermined value or higher.

5. The converter device according to claim 4, wherein:

the limiting of the on/off switching of the step-up switching element is discontinuation of an ON state and continuation of an OFF state of the step-up switching element, and the limiting of the on/off switching of the step-down switching element is discontinuation of an OFF state and continuation of an ON state of the step-down switching element.

6. A rotating electrical machine control device, comprising:

the converter device according to claim 5;

an inverter, connected to the converter device, which receives the secondary voltage and controls transmission and reception of electric power to and from a rotating electrical machine;

a secondary target voltage determining device that derives the secondary target voltage corresponding to a target torque and a rotation speed of the rotating electrical machine; and a motor control device that controls the inverter so that an output torque of the rotating electrical machine is controlled to the target torque based on the target torque and the rotation speed of the rotating electrical machine and the secondary target voltage.

7. A drive device, comprising:

the rotating electrical machine control device according to claim 6; and an electric motor that drives wheels, wherein the electric motor is the rotating electrical machine that receives electric power from the inverter of the rotating electrical machine control device.

8. A drive device, comprising:

a first rotating electrical machine;

a second rotating electrical machine;

a first inverter that transmits and receives electric power to and from the first rotating electrical machine;

a second inverter that transmits and receives electric power to and from the second rotating electrical machine;

a converter circuit that includes a reactor having one end connected to a positive electrode of a primary side power supply, a step-up switching element for switching on and off between an other end of the reactor and a negative electrode of the primary side power supply, a step-down switching element for switching on and off between the first inverter and the second inverter and the other end, and diodes respectively connected in parallel with the switching elements, the converter circuit applying a secondary voltage generated by on/off switching of each switching element to the first inverter and the second inverter;

a first secondary target voltage determining device that derives a first secondary target voltage corresponding to a target torque and a rotation speed of the first rotating electrical machine;

a second secondary target voltage determining device that derives a second secondary target voltage corresponding to a target torque and a rotation speed of the second rotating electrical machine;

a converter control device that sets a higher one of the first secondary target voltage and the second secondary target voltage as a secondary target voltage of the converter circuit, and pulse width modulation(PWM)-controls on/off switching of the step-up switching element and the step-down switching element so that the secondary voltage becomes equal to the secondary target voltage;

a first motor control device that controls the first inverter based on the target torque and the rotation speed of the first rotating electrical machine and the secondary voltage so that an output torque of the first rotating electrical machine is controlled to the target torque;

a second motor control device that controls the second inverter based on the target torque and the rotation speed of the second rotating electrical machine and the secondary voltage so that an output torque of the second rotating electrical machine is controlled to the target torque;

a temperature detecting device that detects a temperature of the reactor; and a converter control limiting device that stops the PWM-controlled on/off switching of the step-up switching element when the temperature of the reactor increases to a first predetermined value or higher.

9. The drive device according to claim 8, wherein:
the converter control limiting device starts an annealing process for sequentially reducing the secondary target voltage of the converter circuit in a predetermined pattern when the temperature of the reactor increases to the first predetermined value or higher, and discontinues on/off switching of the step-up switching element for step-up operation when the secondary target voltage reduces to a voltage of the primary side power supply.

10. The drive device according to claim 9, wherein:
when the temperature of the reactor reduces to a value equal to or lower than a second predetermined value lower than the first predetermined value after the on/off switching is stopped, the converter control limiting device starts an annealing process for sequentially increasing the secondary target voltage of the converter circuit in a predetermined pattern by starting the on/off switching in order to increase the secondary voltage to the secondary target voltage.

11. The converter device according to claim 8, wherein:
the converter control limiting device limits the PWM-controlled on/off switching of the step-down switching element when the temperature of the reactor increases to the first predetermined value or higher.

12. The converter device according to claim 11, wherein:
the limiting of the on/off switching of the step-up switching element is discontinuation of an ON state and continuation of an OFF state of the step-up switching element, and the limiting of the on/off switching of the step-down switching element is discontinuation of an OFF state and continuation of an ON state of the step-down switching element.

13. The drive device according to claim 8, wherein:
the first rotating electrical machine is an electric motor that rotatably drives wheels, and the second rotating electrical machine is an electric generator that is rotatably driven by an engine of a vehicle having the wheels.

* * * * *